Jan. 17, 1950  C. E. BOUCHER  2,494,740
FILM HOLDER
Filed May 18, 1948
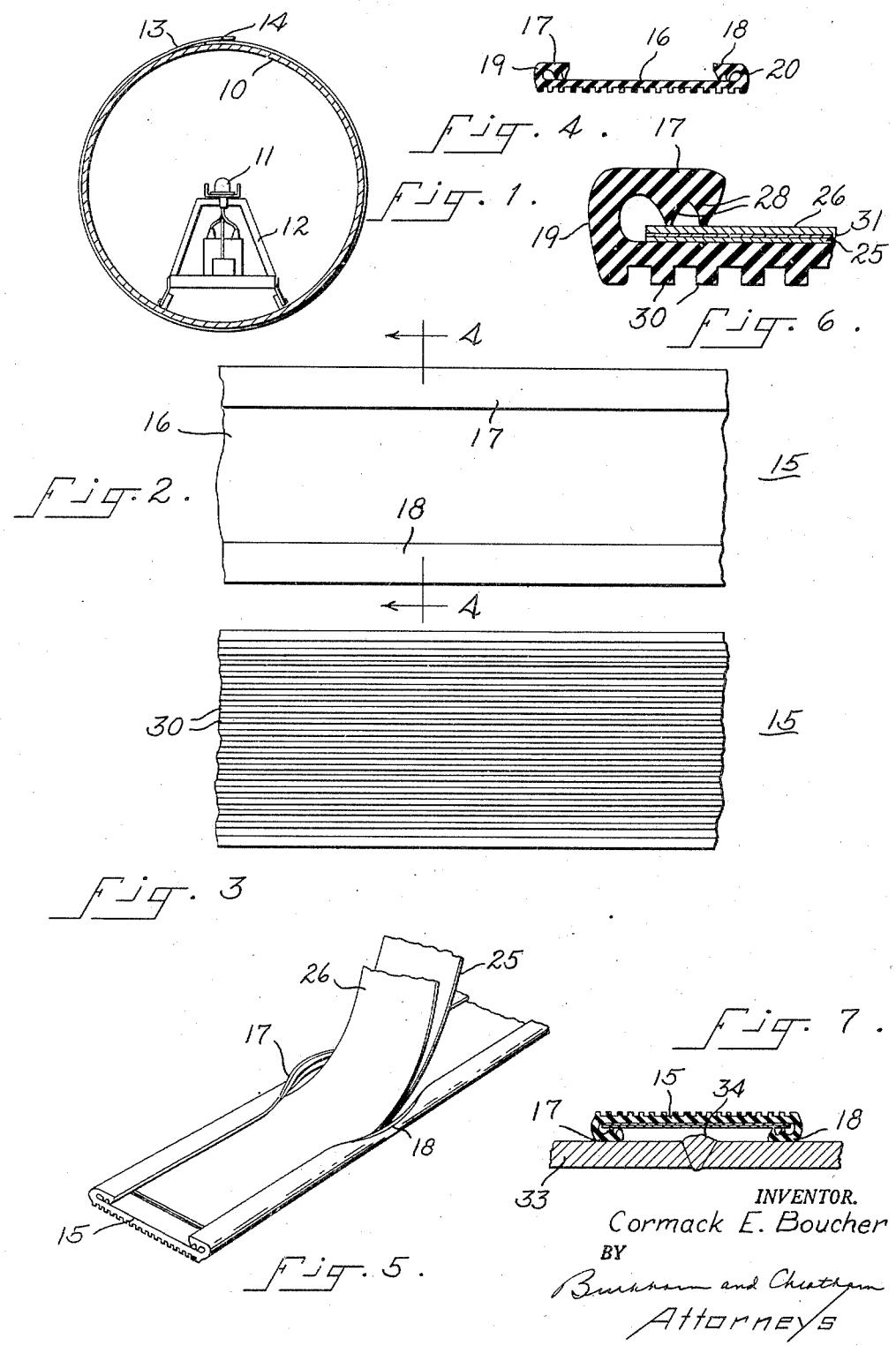
INVENTOR.
Cormack E. Boucher
BY
Burnham and Cheatham
Attorneys Patented Jan. 17, 1950

2,494,740

UNITED STATES PATENT OFFICE 2,494,740

FILM HOLDER

Cormack E. Boucher, Seattle, Wash.

Application May 18, 1948; Serial No. 27,651

4 Claims. (Cl. 250—68)

The present invention relates to film holders, and, while their usage is not necessarily limited thereto, the film holders are particularly suitable for use in radiographic testing of metal bodies.

Radiographs are, ordinarily, made under daylight conditions so that it is necessary to inclose the film within a lightproof holder or envelope to protect the same against exposure by visible light. Such holders as have been devised heretofore for radiographic film have usually been relatively expensive, cumbersome and unwieldly to handle, inflexible, difficult to load and unload and extremely limited in application. It is, therefore, a general object of the present invention to provide new and improved film holders particularly suitable for use in radiography, which holders are relatively easy to manufacture, inexpensive, flexible and efficient in operation.

In radiographing a wall of a hollow, curved metal body, such as a tank or pipe, the source of penetrative rays may be arranged on the axis of curvature of the wall and the film placed over the outer surface. In the event that a circumferential weld is to be radiographed, it is possible to wrap an elongated strip of suitably inclosed film thereabout and cover the entire weld by a single exposure. The film holder, in such case, should be of relatively long length and flexible so that, when it is wrapped about the cylindrical surface, it will fit snugly thereagainst throughout its entire length and, furthermore, should be so constructed that it may be conveniently loaded and unloaded without damage to the film or to the holder so that the latter may be continuously reused. This is one typical application for which no practicable film holder has been heretofore developed and for which the holder of the present invention is well suited.

A further object of the present invention, therefore, is to provide a flexible film holder which may be applied in juxtaposed relation against irregular surfaces. A further object of the present invention is to provide a flexible elongated film holder particularly adapted for use with strip film of relatively long lengths. A still further object is to provide a film holder having a new and improved light seal at the edge portions thereof.

In accordance with the illustrated embodiment, the film holder comprises a molded, elongated body member formed of an opaque flexible plastic material, such as rubber, and having a substantially flat upper surface. A flap is formed integrally with each of the opposite longitudinal edge portions of the body member overlying in close proximity the opposite edge portions of the upper surface and which flaps are biased toward the upper surface by the inherent resiliency of the material itself. A strip of film together with an independent flexible opaque backing or cover strip of the same width as the film or having a width at least as wide as the upper surface of the body member may be inserted simultaneously into the holder by bending back the flaps progressively along the length thereof as the film and cover strip are inserted in place against the upper surface of the body member. Following insertion of the film and cover strip the flaps, by reason of their inherent resiliency, will engage with the upper surface of the cover strip to effect a light-tight seal thereagainst for protection of the film positioned therebeneath. The loaded film holder may then be wrapped about the surface of the body to be radiographed and, following exposure, the film may readily be removed by spreading the flaps apart in a manner opposite to that required for loading. The cover strip and body member may be reused indefinitely.

For a consideration of what is believed novel and inventive, attention is directed to the following description taken in connection with the accompanying drawing while the features of novelty will be pointed out with greater particularity in the appended claims.

In the drawings, Fig. 1 is a cross-sectional view taken through a section of pipe or tank and illustrating a typical application for a film holder constructed in accordance with the present invention; Fig. 2 is a plan view illustrating a portion of a film holder of the present invention; Fig. 3 is a plan view illustrating the opposite side of the film holder portion shown in Fig. 2; Fig. 4 is a cross-sectional view taken along the line 4—4 of Fig. 2; Fig. 5 is a view in perspective illustrating the manner in which the film holder of the present invention may be loaded and unloaded; Fig. 6 is an enlarged fragmentary sectional view illustrating a portion of the loaded film holder; and Fig. 7 is a cross-sectional view illustrating the loaded film holder positioned over a weld to be radiographed.

The invention will now be described with particular reference to a holder for elongated strip film suitable for use in radiographic inspection of annular welds of hollow metal bodies such as tanks or pipes; but it is pointed out that the present invention is not to be necessarily limited for use with film of any particular dimensions. The illustrated embodiment is merely to be taken as one form of the invention, and other variations will readily occur to any mechanic skilled in the art.

Referring now to the drawing, in Fig. 1 is illustrated a cylindrical structure 10 such as a pipe or tank having an annular weld which is to be radiographed for the determination of the soundness thereof. A source 11 of penetrative rays, such as an X-ray tube or a radium capsule, is positioned by suitable supporting means 12 in the center of the cylinder or so arranged that the penetrative rays are permitted to radiate outwardly therefrom throughout an angle of 360°. A film holder 13 constructed in accordance with the present invention and containing an elongated strip of film is wrapped about the cylinder 10 directly over the annular weld therein and secured in place by any suitable means (not shown). In order to insure complete coverage of the annular weld, the opposite ends of the film holder are overlapped as indicated at 14.

The film holder of the present invention may be made in any desired lengths and, as will be pointed out more fully hereinafter, may be initially manufactured in substantially continuous lengths and wound up in large coils from which shorter lengths may be severed as may be required for specific jobs.

Referring now to the views of Figs. 2, 3 and 4, the film holder comprises a molded body member indicated generally at 15 made of a relatively flexible opaque plastic material such as rubber or rubber-like compound. The body member is provided with a substantially flat upper surface 16 having a width slightly greater than the width of the film which is to be used therewith. Flaps 17 and 18 are formed integrally with the opposite longitudinal edges of the body member 15 and which flaps overlie the opposite edge portions of the upper surface 16 in close proximity thereto. Hinge portions indicated at 19 and 20 join the edges of the flaps 17 and 18 respectively and the adjacent edge portions of the body member 15. The body member 15 is made relatively thick so as to be quite stiff in order to retain its flat shape during ordinary handling thereof. The flaps 17 and 18 as well as the hinge portions 19 and 20 integrally joining the flaps to the body member 15 are also relatively thick whereby the lower surfaces of the flaps are biased with a considerable pressure against the upper surface 16 of the body member.

As shown in Fig. 5, the film holder consisting of a body member 15 of the desired length may be loaded by spreading apart the flaps 17 and 18 at one end thereof and inserting a strip of film 25 together with a superimposed cover or backing strip 26 therebeneath. The film 25 as well as the backing strip 26 may be precut to the required length or may be fed from supply rolls and severed when the holder has been fully loaded. The flaps may be spread apart along the opposite edges of the body member progressively along the length thereof as the film 25 and the backing strip 26 are inserted in position. Immediately upon release of the flaps after insertion of the film and backing strip, the lower surface of the flaps will engage securely against the upper surface of the backing strip as indicated more clearly in the enlarged view of Fig. 6. In order to enhance the formation of a lightproof seal between the flaps and the backing strip 26, the lower surfaces of the flaps 17 and 18 are provided with one or more continuous longitudinal ribs or fins 28 having a relatively thin outer edge which thin edge is urged into tightly compressed condition with the upper surface of the backing strip. The opposite ends of the loaded holder may be lightproofed by any suitable means such as by wrapping several layers of opaque adhesive tape thereabout.

The body member 15 is preferably formed by extrusion, and it has been discovered that the compound, upon curing, developes a rather high stress within the hinge portions 19 and 20 joining the flaps to the main portion of the body member whereby the flaps are biased with a considerable force against the upper surface 16 of the body member. The thickness of the hinge portions is substantially as great as that of the remainder of the body portion so as to insure that the flaps will be held in light sealing engagement with the upper surface of the backing strip 26 during all normal handling of the loaded holder. During actual operation, it has been discovered that the loaded holders may be twisted, wrapped about irregular surfaces, or wound into tight coils in daylight without resulting in any leakage of light beneath the flaps. In order to facilitate the formation of a relatively flat upper surface 16 free of ripples, or waves, on the body member, a multiplicity of relatively closely spaced parallel continuous longitudinal ribs 30 are provided across the surface of the body member 15 opposite the flat surface 16. It is to be understood, however, that such ribs are not essential and may be omitted as desired.

The cover or backing strip 26 may be of any suitable opaque material, either paper, plastic, fabric or metal. An intensifier screen may also be loaded into the holder next adjacent the film 25. To facilitate the loading of the holder, the intensifier screen may conveniently be combined with the cover or backing strip 26 either in the form of a coating applied to the surface thereof next adjacent the film or in the form of a separate layer attached thereto. In practice, I have found it expedient to form the backing or cover strip 26 of relatively stiff paper and against one surface of which I have adhesively secured a layer of lead foil, the cover strip being loaded into the holder with the foil layer next adjacent the film 25.

As illustrated in the fragmentary detail view of Fig. 6, attention is directed to the fact that the ridges 28 of the flap portions 17 and 18 bear with considerable pressure against the upper surface of the backing or cover strip 26 whereby good contact is insured between the intensifier screen or lead foil 31 and the film 25. Close contact between the film and the screen or foil is desirable in order to insure sharp definition of the image formed on the film upon exposure to penetrative rays. The flap portions 17 and 18 thus serve not only to effect a lightproof seal along the opposite side edges of the film holder but also to maintain close contact between the film and the intensifier element.

The film holder as described may be positioned with either side thereof next adjacent the surface of the body to be radiographed. If the ribs 30 are placed next adjacent the surface of the body, they will cause a series of faint longitudinal parallel streaks upon the film but which will not seriously interfere with the inspection of the principal image formed thereon. As stated above, however, the film holder as described is particularly suitable for use in radiographing annular welds and, in which case, the weld bead normally projects somewhat above the adjacent wall surfaces. As illustrated in Fig. 7, I prefer to arrange the film holder with the flap portions 17 and 18 next adjacent the surface of the object 33 being radiographed. These flap portions thereby serve as spacer means for positioning the intermediate portion of the film holder, and hence also the film, out of contact with the weld bead 34. Rocking of the film holder across the raised bead is thereby prevented and a more secure fastening of the film in position is facilitated.

From the description given, it will be obvious that the film holder of the present invention may be loaded and unloaded within a small or limited dark space and which is of particular importance in field operations.

Having described the invention in what I consider to be a preferred embodiment thereof, it is desired that it be understood that the specific details shown and described are merely illustrative and that the invention is susceptible to considerable variation without departing from the spirit and scope of the invention. It is intended, however, to cover all such variations and modifications as may occur to one skilled in the art by the appended claims.

I claim:

1. A strip film holder comprising a substantially continuous elongated flexible plastic body member from which desired shorter lengths may be severed for use, said member being of substantially uniform cross-sectional configuration throughout its entire length, said member having a substantially flat upper surface portion, a plurality of closely spaced ribs extending longitudinally of said body member throughout the full length thereof and on the lower surface thereof, a flap extending along each of the opposite longitudinal side edges of said body member and above said upper surface portion, corner hinge portions integrally uniting the adjacent edges of said flaps and said body member, the inner edges of said flaps being spaced widely apart so as to expose said upper surface portion of said body member therebetween, a longitudinal bead extending downwardly from the lower surface of each of said flaps toward said upper surface portion throughout the full length of said flaps, said beads being biased by the resilient preformed set of said hinge portions into substantial engagement with said flat upper surface portion of said body member throughout the full length thereof, said bead being spaced inwardly from the outer edge of said flat upper surface portion.

2. A holder for strip film comprising a substantially continuous elongated base member from which desired lengths may be severed in accordance with requirements for any particular usage, said member being of stiff, flexible material of uniform, cross-sectional configuration throughout the entire length thereof, said member having a flat upper surface, a flexible flap integral with each of the opposite side edges of said member and double back over said upper surface, the lower surface of said flaps being biased into substantial engagement with said upper surface of said member by the preset resiliency of the material forming said member.

3. A strip film holder comprising a substantially continuous elongated member from which predetermined desired shorter lengths may be severed for use in accordance with the length requirements of any particular job, said member consisting of stiff, flexible material and being of uniform cross-sectional configuration throughout the entire length thereof, said member having a substantially flat upper surface, a flap integral with each of the opposite side edges of said member and doubled back over said upper surface, a longitudinal bead extending from the underneath side of each of said flaps toward said upper surface and biased into substantial engagement therewith by the resiliency of the material forming said flaps.

4. A strip film holder comprising a substantially continuous elongated base member from which predetermined, desired shorter lengths may be severed in accordance with the length requirements for any particular job, said member consisting of stiff, flexible material and being of uniform cross-sectional configuration throughout the entire length thereof, said member having a flat upper surface, a flap integral with each of the opposite side edges of said member and doubled back over said upper surface, an elongated, flat, opaque strip of flexible material covering said upper surface and having the opposite edge portions extending beneath said flaps, said flaps resiliently engaging the upper surface of said opaque strip and effecting a lighttight seal therewith.

CORMACK E. BOUCHER.

REFERENCES CITED

The following references are of record in the file of this patent:

UNITED STATES PATENTS

| Number | Name | Date |
|---|---|---|
| 1,537,925 | Bolin | May 12, 1925 |
| 1,631,497 | Marler | June 7, 1927 |
| 2,340,923 | Boucher | Feb. 8, 1944 |
| 2,357,969 | Powers | Sept. 12, 1944 |
| 2,381,261 | Cota | Aug. 7, 1945 |
| 2,390,211 | Forssell | Dec. 4, 1945 |
| 2,412,174 | Rhoades | Dec. 3, 1946 |

FOREIGN PATENTS

| Number | Country | Date |
|---|---|---|
| 533,697 | Great Britain | Feb. 18, 1941 |